Oct. 20, 1931.  F. F. CHANDLER  1,828,594
STEERING GEAR ROLLER PIN
Filed Sept. 30, 1929   2 Sheets-Sheet 1
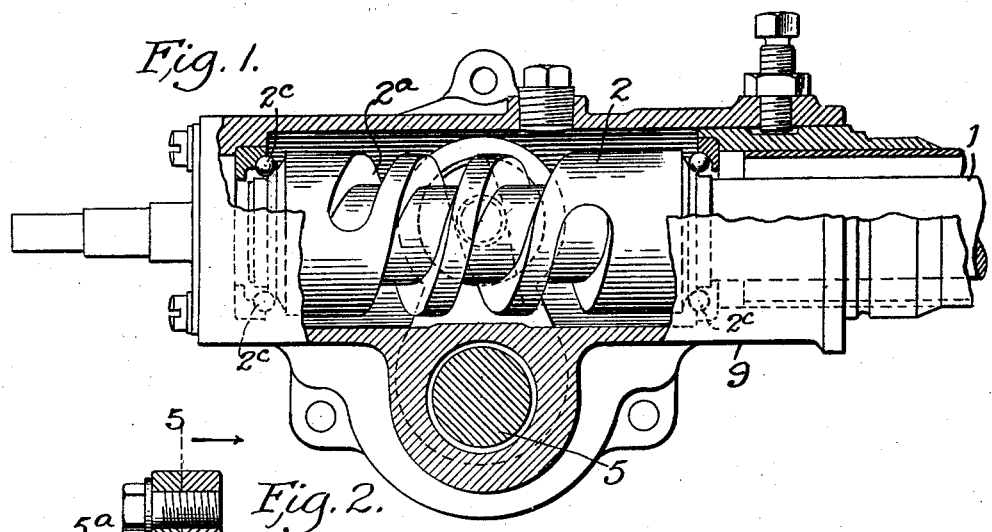
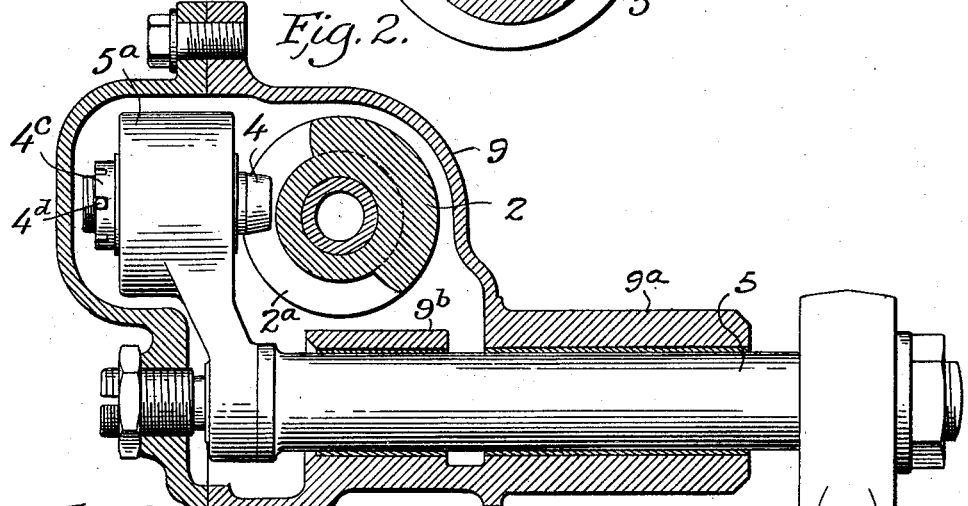
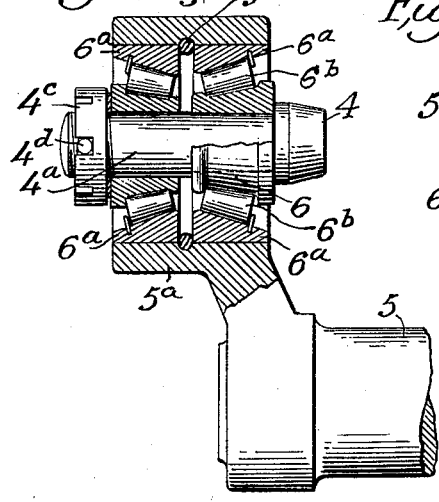
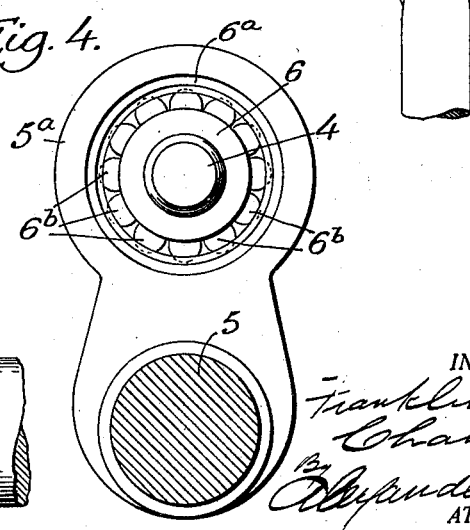
INVENTOR.
Franklin F. Chandler
By Alexander Powell
ATTORNEYS

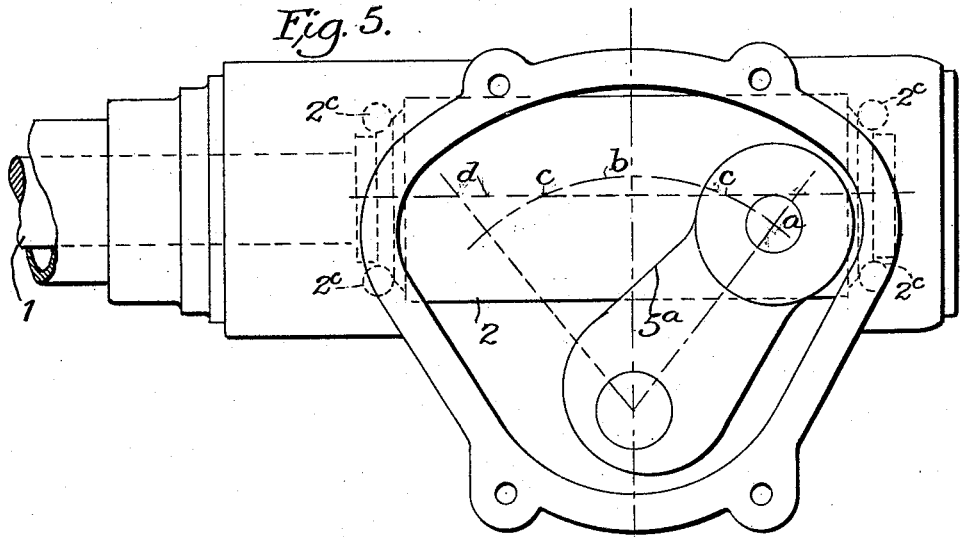
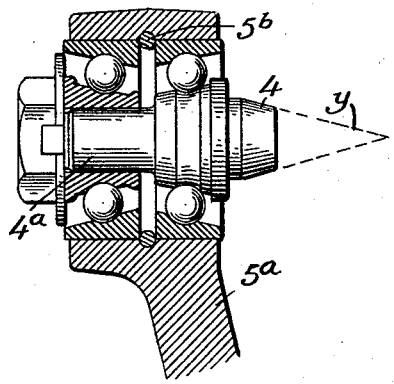

Patented Oct. 20, 1931

1,828,594

UNITED STATES PATENT OFFICE

FRANKLIN F. CHANDLER, OF LA FAYETTE, INDIANA, ASSIGNOR TO ROSS GEAR & TOOL COMPANY, OF LA FAYETTE, INDIANA, A CORPORATION OF INDIANA

STEERING GEAR ROLLER PIN

Application filed September 30, 1929. Serial No. 396,227.

This invention is an improvement in steering gears of the so-called "cam and lever" type, as shown for example in Ross Patent No. 1,567,997, dated December 29, 1925. In said gears rotary motion of the steering shaft is directly converted into rocking motion of the rocker-arm shaft by means of an actuating member connected to the steering shaft and having a helical cam groove engaged with a pin on an arm of the rocker shaft.

The object of the present invention is to improve the construction of such pin and mount it in anti-friction roller bearings on the rocker arm in such manner that the pin can rotate and adjust itself to the groove in all positions of its arcual travel even though the ratio of the pitch of the groove varies but the pin while free to rotate will not be axially movable in the rocker arm.

To enable others to readily adopt and use the invention, I will explain it with reference to the accompanying drawings which illustrate a cam and lever gear of the Ross type provided with my novel roller pin and mountings therefor. In the claim the novel features of the invention for which protection is desired are summarized.

In said drawings:

Fig. 1 is a side view partly broken away and partly in section of a Ross cam and lever steering gear equipped with my novel roller pin and anti-friction mountings therefor.

Fig. 2 is a transverse section through Fig. 1 in the plane of the rocker shaft, the rocker shaft and roller pin being shown in elevation.

Fig. 3 is an enlarged detail view of the rocker arm partly in section and showing one means of mounting the roller pin therein.

Fig. 4 is a right hand end view of Fig. 3.

Fig. 5 is a diagrammatic sectional view on the line 5—5 Fig. 2.

Fig. 6 is a view similar to Fig. 3 but showing ball bearings in place of roller bearings.

The steering gear may be of any suitable construction, that shown being a Ross cam and lever gear in which, as shown in Figs. 1 and 5, the steering shaft 1 has an actuating member 2 on its end within a housing 9. The actuating member 2 is supported and confined in the casing by anti-friction bearings 2c, such as used in the said Ross gear.

The actuating member 2 has a spiral groove 2a which is engaged by the head 4 of a roller-pin which is rotatably mounted in anti friction bearings in the arm 5a of the rocker shaft 5 which is shown as journaled in a bearing 9b in casing 9, and a bearing in a lateral extension 9a of said casing.

As shown in Fig. 3 the roller-pin 4 has a cylindric shank 4a which is mounted in antifriction bearings within a bore in the rocker arm 5a. Each bearing is shown in Fig. 3 as consisting of an inner annular member 6, an outer annular member 6a, and interposed rollers 6b. When rollers are employed they may be cylindric or tapered as desired. The adjacent members 6 of the bearings are slightly spaced apart on the shank of the pin by means of an annulus or ring 5b which is seated in an annular groove in the bore.

The roller pin is confined to the arm, and in the roller bearings, by means of a nut 4c screwed on the end of shank 4a opposite head 4; a washer being preferably interposed between the nut and the outer bearing member. The nut may be locked in adjusted position by a pin or cotter 4d or other suitable means. It will be seen that both ends of the roller pin shank are supported in anti-friction bearings, and the roller-pin 4 is free to rotate on its own axis, as may be required, when the actuating member is turned to cause the pin to move the rocker arm to the right or the left; but any end thrust on the pin is transmitted through the anti-friction bearings to the rocker arm 5a.

As illustrated in diagram, Fig. 5, the axis $a$ of the roller-pin 4 traverses an arc $b$ as the arm 5a moves from one extreme position to the other; and in so doing the axis $a$ of the roller-pin intersects the plane of the axis $d$ of the actuating member 2 at two points $c, c$, at which points the axis of the pin 4 is in the same plane as the axis of the member 2 and perpendicular thereto.

The opposite side walls of the helical groove 2a are preferably slightly tapered or beveled outwardly and the head 4 of the roller pin is similarly tapered so that diametrically opposite sides of the head will fit against and closely engage the opposed walls of the cam groove.

In Fig. 6 the construction is similar to that shown in Fig. 3 except balls are shown instead of rollers.

Axial movement of the pin is prevented by the oppositely disposed anti-friction bearings which transmit end thrust on the pin direct to the arm, the inner bearing transmitting outward end thrust on the pin to the arm; and the outer bearing transmitting inward end thrust on the pin to the arm; so that the pin can neither be drawn into the groove nor forced away from the groove by the wiping action of the wall of the groove on the head of the pin when the latter is operating above or below the plane of the axis of the actuating member as described.

The invention is not restricted to the specific type of gear illustrated, and may be adapted to other types of gears in which one member is operated by a pin engaging a spiral groove in another member.

I claim:

In a steering gear having a spirally grooved actuating member, a rocker shaft, and an arm on said shaft projecting beside the actuating member and having an opening parallel with the rocker shaft and opposite the actuating member, and an annular groove in the wall of said opening intermediate its ends; anti-friction bearings disposed in said opening at opposite sides of said groove; a roller pin having a shank rotatably mounted in said bearings and a tapered head engaging the groove in the actuating member; means securing the roller pin in the anti-friction bearings, and a spring-ring in said groove cooperating with said means to prevent axial movement of the pin and bearings in the opening.

FRANKLIN F. CHANDLER.